US012131654B2

(12) United States Patent
Vivanco

(10) Patent No.: US 12,131,654 B2
(45) Date of Patent: Oct. 29, 2024

(54) DETECTING AERIAL COVERAGE USING ADVANCED NETWORKING EQUIPMENT

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 358 days.

(21) Appl. No.: 17/662,007

(22) Filed: May 4, 2022

(65) Prior Publication Data

US 2023/0360545 A1 Nov. 9, 2023

(51) Int. Cl.
*G08G 5/00* (2006.01)
*B64C 39/02* (2023.01)
*G05D 1/00* (2006.01)
*B64U 101/20* (2023.01)

(52) U.S. Cl.
CPC ........... *G08G 5/006* (2013.01); *B64C 39/024* (2013.01); *G05D 1/106* (2019.05); *B64U 2101/20* (2023.01)

(58) Field of Classification Search
None
See application file for complete search history.

(56) References Cited

U.S. PATENT DOCUMENTS

2012/0264469 A1* 10/2012 Dartois ................ H04B 7/0408
455/562.1

OTHER PUBLICATIONS

"Study on new radio access technology, Physical layer aspects" 3GPP Specification #38.8020, https://panel.castle.cloud/view_spec/38802-e20/pdf/, Sep. 2017, 143 pages.

* cited by examiner

*Primary Examiner* — Suhail Khan

(57) ABSTRACT

An architecture related to advanced networking equipment providing aerial coverage data to unmanned aerial vehicles. A method can comprise based on object data, determining a number value associated with a group of beams configured to be emitted by serving cell equipment, based on down tilt data, determining a beam of the group of beams, and based on the object data and the down tilt data, determining that the serving cell equipment is capable of servicing an unmanned aerial vehicle.

20 Claims, 11 Drawing Sheets

DETECTING AERIAL COVERAGE USING ADVANCED NETWORKING EQUIPMENT

TECHNICAL FIELD

The disclosed subject matter relates to advanced networking equipment providing aerial coverage data to user equipment (UE) such as unmanned aerial vehicles (UAVs) and/or aerial UE. The advanced networking equipment can be, but not limited to, long term evolution (LTE) and/or fifth-generation (5G) network equipment.

BACKGROUND

Wireless operators can use terrestrial cellular network equipment, such as long-term evolution (LTE) and/or fifth-generation (5G) core mobile network operator (MNO) equipment to provide services to aerial UE. Aerial user equipment UE can have multiple use cases (e.g., delivery, monitoring, . . . ). Wireless operators can have aerial coverage maps, which can indicate areas with and without cellular coverage. In addition, unmanned aerial vehicles (UAVs), such as aerial UE, can scan neighbor equipment signal pilots (e.g., reference signal received power (RSRP) measurement values) to determine whether they can fly in a given direction.

DETAILED DESCRIPTION

Figure 1:
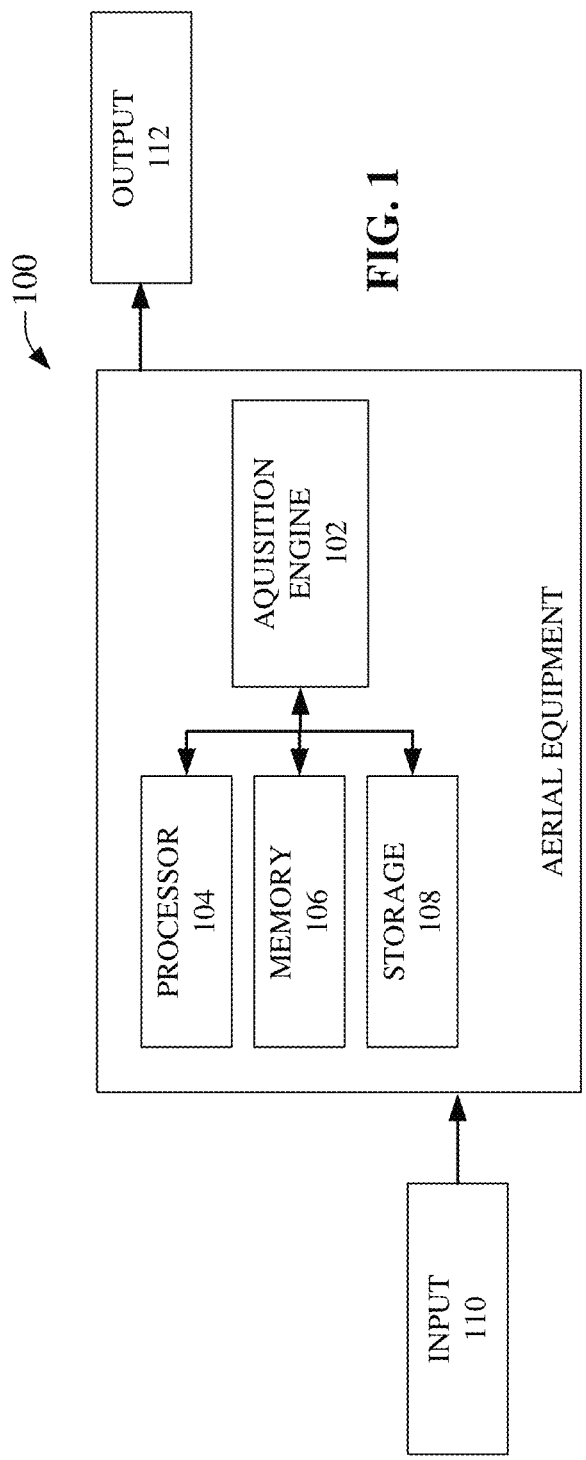
FIG. 1 is an illustration of a system for advanced networking equipment to provide aerial coverage data to UE such as UAVs and/or aerial UE, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor (and/or one or more additional processors), and a memory (and/or one or more additional memories) that stores executable instructions that, when executed by the processor, facilitate performance of operations. The operations can comprise determining based on data object data a number value associated with a group of energy beams that have been configured to be emitted by serving cell equipment, determining based on down tilt data associated with an energy beam of the group of energy beams, and based on the data object data and the down tilt data, determining that the serving cell equipment is capable of servicing an unmanned aerial vehicle.

Additional operations can include determining based on the down tilt data a maximum height over terrain that is achievable by the unmanned aerial vehicle, and transmitting feedback data to the serving cell equipment, wherein the feedback data represents an actual maximum height over terrain achieved based on the a group of beams emitted by the serving cell equipment. Further operations can also include determining, by the unmanned aerial vehicle, based on the data object associated with the group of energy beams that the serving cell equipment is actively emitting and associated down tilt beam data, a maximum height over terrain that is achievable to facilitate communication by the serving cell equipment with the unmanned aerial vehicle in a forward link direction, and transmitting feedback data from the unmanned aerial vehicle to counterpart network equipment, and wherein the feedback data represents an actual maximum height over terrain achieved based on the group of energy beams emitted by the serving cell equipment and associated down tilt beam data.

In regard to the above operations the data object data and the down tilt data can be sent from the serving cell equipment to the unmanned aerial vehicle in the forward link direction, the data object data can include string data representative of the energy beam of the group of energy beams that the serving cell equipment is actively emitting, and the down tilt data can comprise string data representative of a down tilt angle associated with the energy beam of the group of energy beams that the serving cell equipment is actively emitting. Further, the down tilt data can represent a down tilt angle of a group of antenna array associated with emitting the group of energy beams, wherein the down tilt angle can be measured from a vertical plane that is orthogonal to a horizontal plane.

In accordance with further embodiments, the subject disclosure describes methods and/or processes, comprising a series of acts that, for example, can include: based on object data, determining, by a system comprising a processor, a number value associated with a group of beams configured to be emitted by serving cell equipment, based on down tilt data, determining, by the system, a beam of the group of beams, and based on the object data and the down tilt data, determining, by the system, that the serving cell equipment is capable of servicing an unmanned aerial vehicle.

In regard to the following, the object data can comprise binary string data representative of a beam of the group of beams being emitted by the serving cell equipment, the down tilt data can comprise string data representative of a down tilt angle associated with a beam of the group of beams being emitted by the serving cell equipment, and the down tilt data can represent a down tilt angle of a group of antenna array associated with the group of beams being emitted by the serving cell equipment, wherein the down tilt angle is measured from a vertical plane that is orthogonal to a horizontal plane.

In accordance with still further embodiments, the subject disclosure describes machine readable media, a computer readable storage devices, or non-transitory machine readable media comprising instructions that, in response to execution, cause a computing system (e.g., apparatus, equipment, devices, groupings of devices, etc.) comprising at least one processor to perform operations. The operations can include: based on object data, determining a number value associated with a group of beams configured to be emitted by serving cell equipment, based on down tilt data, determining a beam of the group of beams, and based on the object data and the down tilt data, determining that the serving cell equipment is capable of servicing an unmanned aerial vehicle.

Additional operations can comprise transmitting feedback data to counterpart network equipment, wherein the feedback data represents an actual maximum height over terrain achieved by the unmanned aerial vehicle based on the a group of beams emitted by the serving cell equipment. Further, certain operations can be effectuated by the unmanned aerial vehicle to determine whether or not the unmanned aerial vehicle can support over the air communications with the serving cell equipment, and to determine a maximum height over terrain that is achievable between the serving cell equipment and the unmanned aerial vehicle. Additionally, the unmanned aerial vehicle, based on determining that the unmanned aerial vehicle is capable of supporting over the air communications with the serving cell equipment and determine the maximum height over terrain that is achievable between the serving cell equipment and the unmanned aerial vehicle, can determine whether or not to enter a coverage area associated with the serving cell equipment.

Further in the context of the foregoing, the object data can be received from the serving cell equipment as an augmentation to a field in RRC_Connect_Reconfiguration message data.

The subject disclosure, in general, describes systems and/or methods for aerial UE to detect aerial coverage provided by advanced network (e.g. new radio (NR) 5G) beam sweeping and react proactively. In order to effectuate this goal, the systems and/or methods can use additional data representing down tilt angle data associated with collections of transmitted beams (e.g., each of the beams radiated by serving cell equipment can comprise information with regard to the tilt angles associated with the antenna arrays from which the beam is emitted from). The additional data can generally be broadcast to UAVs using system information block (SIB) messages that receiving UAVs, on receiving the SIB messages, can read the synchronization signal block (SSB) data and, based on the SSB data, UAVs can determine whether the serving cell equipment is capable of supporting aerial coverage for UAVs. Further, UAVs can determine a maximum altitude that can be permissible for it to attain while still being attached to each emitted energy beam of the collection of beams transmitted by the serving cell equipment.

The additional advanced network beam data (e.g., NR 5G beam data) can be used by UAVs to determine whether serving cell equipment can support aerial coverage for UAVs, and to determine (estimate) a maximum altitude the UAVs can reach while still being connected (attached) to each energy beam of groups of energy beams emitted by terrestrial based serving cell equipment. The subject disclosure it is believed can reduce or minimize cell drops and/or latencies associated with UAVs being connected to terrestrial based serving cell equipment.

In general, in advanced network beam sweeping, UE can perform cell searches on groups of permitted/allowed frequencies. The synchronization raster can indicate the frequency positions of the synchronization blocks that can be used by UE for system acquisition. The channel raster can define step-sizes for this search procedure and consequently it can influence the time UE will take to complete initial search procedures. In further acts, UE can decode primary synchronization signals (PSS) data, secondary synchronization signals (SSS) data, and the new radio physical broadcast channel (NR-PBCH) data which can be transmitted as synchronization signal block (SSB) data. Generally, SSB data can comprise four-symbols: one-symbol PSS data, one-symbol SSS data, and two-symbol physical broadcast channel (PBCH) data. Time synchronization in terms of symbol-level and slot-level and frequency synchronization can be realized via PSS data and/or SSS data.

In advanced networks, UE typically need to decode PSS data and SSS data to gain knowledge of physical cell identifier (PCI) data, and then UE can be in a position to decode PBCH data, where UE can receive master information block (MIB) data. Once UE decodes the PBCH data, the UE can decode physical downlink control channel (PDCCH) data and physical downlink shared channel (PDSCH) data to obtain any remaining minimum system information (RMSI) data and other system information (OSI).

In advanced networks, beam sweeping refers to a technique in which serving cell equipment transmit energy beams in predefined directions in a burst at regular intervals, which may cover the entire broadcast serving cell coverage area. SSB data can be transmitted in a batch by forming a synchronization signal burst (SSB)—comprising one SSB per beam—that can be used during beam sweeping by changing beam direction for each SSB transmission. Beam sweeping can be used by UE to measure and identify the best beam for the particular UE. A collection of SSBs can be referred to as a SSB group. Both SSBs and SSB groups can contain one or more elements, wherein the maximum number of SSBs in a SSB group can be frequency-dependent and generally it can comprise: four frequency bands below 3 gigahertz Hertz (GHz); eight frequency bands between 3 to 6 GHz; or 64 frequency bands between 6 to 52.6 GHz. The periodicity of the SSB can be configured by core network equipment, while the default transmission periodicity for initial serving cell equipment selection, and the SSB group periodicity can be the default at 20 milliseconds (ms) for all frequency ranges (e.g., 2 NR frames). The frame and slot time is can be defined by the identifiers of SSBs and acquired by the UE.

SSBs can be transmitted as a burst in the downlink (DL) direction to the UE. Transmit/receive point (TRP) and UE beam sweeping can be used to establish a beam-pair link. Once the connection is established, the same beam-pair link can generally be applied to subsequent transmissions. The reference signal receive power (RSRP) can be measured (determined) for each of the transmit-receive beam pairs, and the beam-pair link with the maximum RSRP can be used.

Serving cell equipment can define multiple candidate positions for SSBs within a radio frame, this number can correspond to the number of beams radiated in a defined or determined direction. Each SSB can be identified by a unique number called a SSB index. An identification of which SSB is detected can depend on where UE is located within the coverage ambit of the radiated beams. UE can measure (determine) the signal strength of each SSB that it detects for a certain defined time period (e.g., a time period measured by the time that elapses for the emission of about one SSB grouping). From this measurement result, UE can identify the SSB index with the strongest signal strength. This SSB with the strongest signal strength can typically be the best beam to which the UE should attach.

Figure 5:
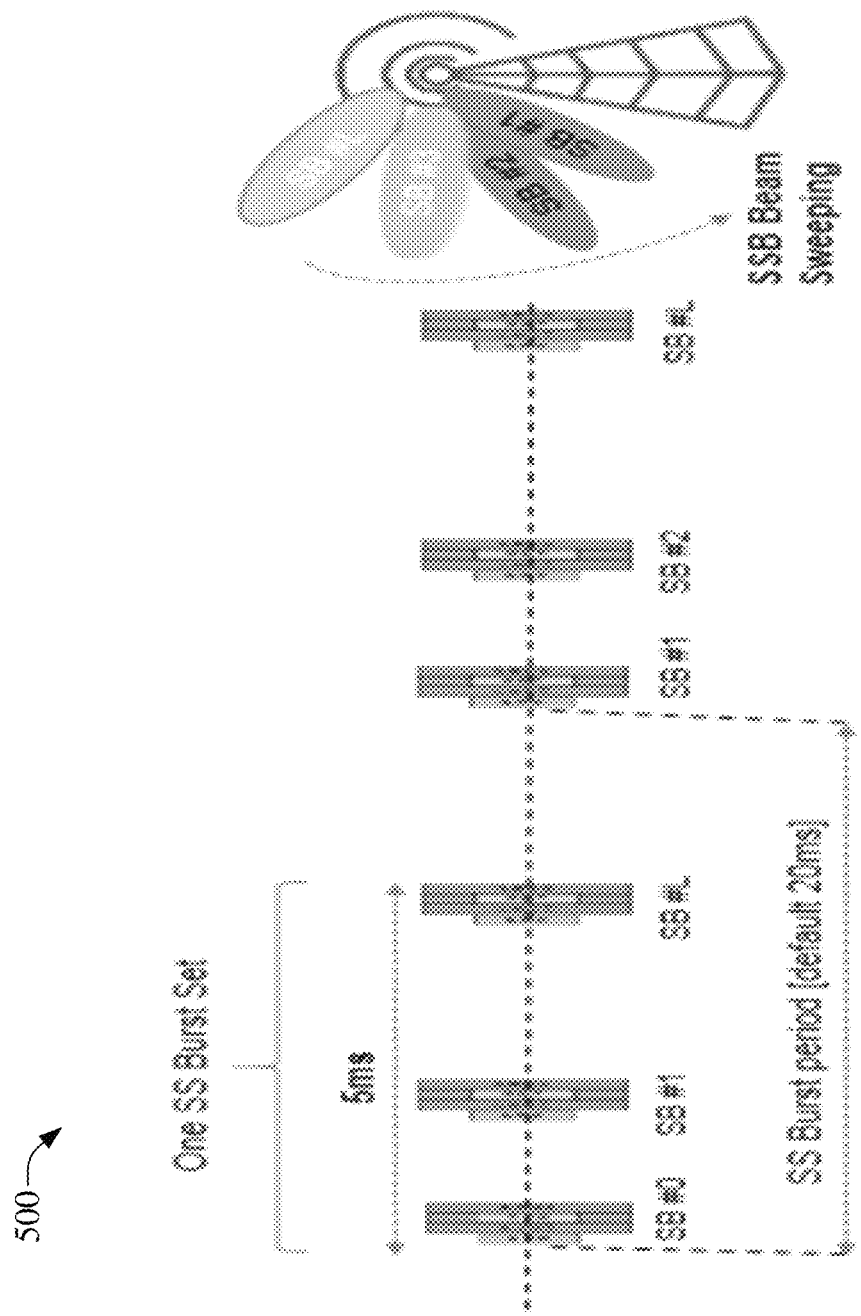
FIG. 5 provides illustration of example SSB groups, example SSB burst periods, and SSB beam sweeping, in accordance with aspects of the subject disclosure.

UE, thus selects the "best beam" amongst the beam grouping(s) and sends physical random access channel (PRACH) data to the location which can have been mapped to a specific SSB beam identifier (ID). The serving cell equipment that emitted the best beam grouping(s) can then determine which beam of the radiated beam groupings that UE detected based on the PRACH data it receives from the UE. In regard to the foregoing detail with respect to example SSB groups (e.g., SSB set), example SSB burst periods, SSB beam sweeping, reference can be made to FIG. 5.

Figure 6:
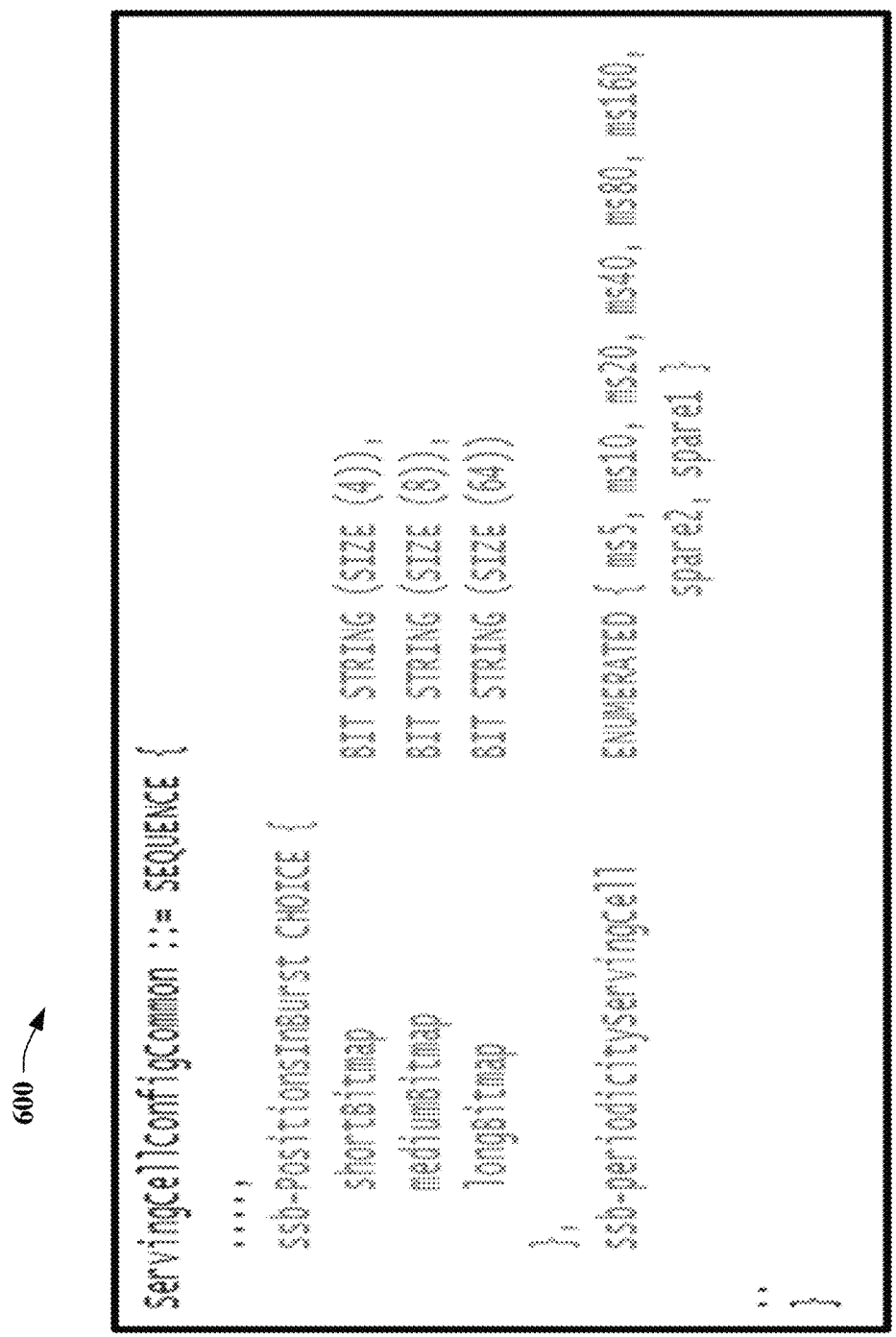
FIG. 6 provides depiction of a example of a ServingCellConfigCommon field in RRC_Connect_Reconfiguration message data, in accordance with aspects of the subject disclosure.

For advanced network serving cell equipment using beam sweeping the serving cell equipment typically is not required to transmit all the SSBs. Depending on core network requirements, serving cell equipment can selectively transmit a few SSB and inform UE which SSBs that were transmitted and which were not transmitted. In the case of standalone (SA), UE will generally receive the SSB transmission pattern from first system information block (SIB1) message data, which can be sent from serving cell equipment. In the case of non-standalone (NSA), UE will typically receive the SSB transmission pattern from RRC_Connection_Reconfiguration message data which can be sent from LTE serving cell anchor equipment (e.g., LTE-eNB anchor equipment). In FIG. 6 a example of the "ServingCellConfigCommon" field in the RRC_Connect_Reconfiguration message data.

The maximum number of SSBs in a SS Burst can be frequency dependent: (a) for frequency bands below 3 GHz the maximum number of SSBs=4, and it can be represented as "shortBitmap" string; (b) for frequency bands between 3 GHz to 6 GHz, the maximum number of SSBs=8, and it can be represented as: "mediumBitmap" string; and (c) for frequency bands between 6 GHz to 52.6 GHz, the maximum number of SSBs=64, and it can be represented by "longBitmap" string.

Interpretation of "shortBitmap," "mediumBitmap," and "longBitmap" can be similar; the first bit (e.g., the left most bit) can indicate a first SSB, the second bit (the second from the left) can be indicative a second SSB, etc. For instance, "shortBitmap=1010," can be representative of the SSB pattern of this advanced network serving cell equipment is in the sub 3 GHz frequency range since only 4 bits (4 SSBs) are defined and the advanced network serving cell equipment can transmit the first SSB (e.g., SSB #0) and the third SSB (e.g., SSB #2). SSB #1 and SSB #3 are not being transmitted.

Figure 7:
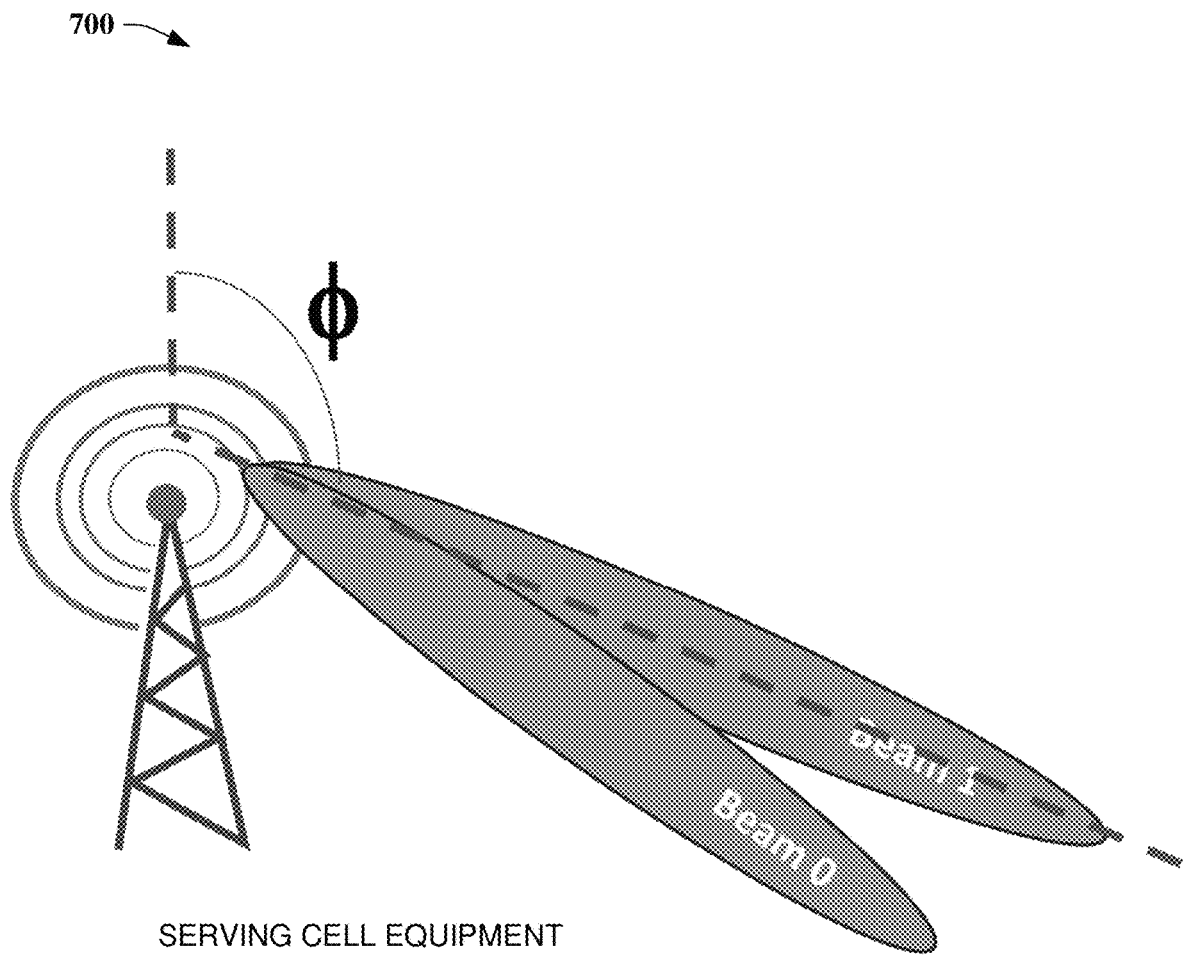
FIG. 7 depicts a scenario where serving cell equipment has energy beams only pointing downwards, in accordance with aspects of the subject disclosure.
Figure 8:
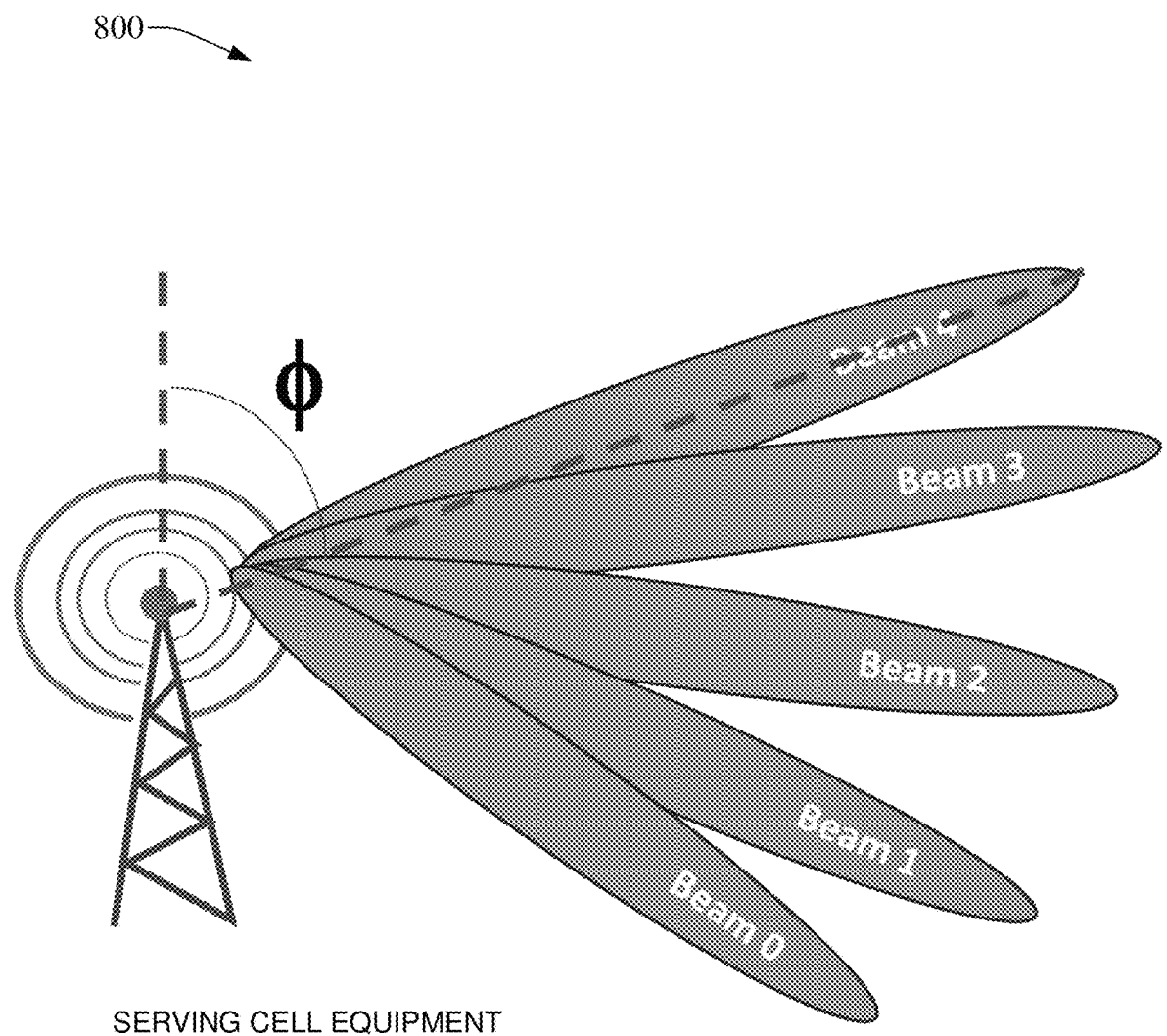
FIG. 8 depicts a scenario where serving cell equipment has some energy beams pointing downwards, and some energy beams pointing up, in accordance with aspects of the subject disclosure.

Serving cell equipment that have implemented the advanced network standards and/or processes that use beam can have several beams configured, some of them pointing downwards towards terrestrial based UE and some of them pointing upward towards aerial UEs (UAVs). FIG. 7 corresponds to serving cell equipment which has energy beams only pointing downwards. FIG. 8 corresponds to serving cell equipment which has some energy beams pointing downwards, and some energy beams pointing up.

MNOs can selectively transmit energy beams in some SSBs. For instance, in FIG. 7 the serving cell equipment can have a maximum number of SSBs=4 (e.g. frequency bands below 3 GHz). However, the MNO, in this instance, has decided not to use beam #3 for transmission. In FIG. 8 the serving cell equipment can have a maximum number of SSBs=8 (e.g., frequency bands between 3 GHz to 6 GHz). However in this instance, the MNO has decided not to use beams #5, #6, #7, and #8 for transmission.

While UE is attached to any beam, it can receive the information of the available beams that the serving cell equipment is transmitting from the fields shortBitmap, mediumBitmap, or longBitmap. Aerial UE (UAVs) typically will receive this information but will not be aware if these beams are pointing up or down as illustrated in FIG. 7 or FIG. 8. In the case depicted in FIG. 7 the serving cell equipment cannot guarantee coverage for UAVs because the beams are currently all pointing down; wherein in the case depicted in FIG. 8, the serving cell equipment can guarantee coverage for UAVs because some of the beams are pointing up. The maximum altitude that UAV can attain under that advanced network protocols can be dependent on serving cell equipment configuration.

The subject disclosure provides systems and methods for advanced networking equipment to provide aerial coverage data to UE such as UAVs and/or aerial UE. The disclosed systems and/or methods can be used by UAV to detect aerial coverage provided by serving cell equipment that have implemented the advanced networking standards set forth in NR-5G protocol, and more particularly, NR-5G beam sweeping, and thereafter in response to detecting that aerial coverage is provided by the serving cell equipment, to react proactively.

The subject disclosure in embodiments provides additional information into the "ServingCellConfigCommon" object either in "RRC_Connection_Reconfiguration" message data or "SIB 1" message data. The addition information included in either the "RRC_Connection_Reconfiguration" message data or the "SIB 1" message data can provide extra information about available aerial serving cell equipment coverage. The new information can include downtilt angles ($\Phi$) of the energy beams. For example:

shortBitmap=1010 downtiltAngle=$\Phi_0, \Phi_1, \Phi_2, \Phi_3$ wherein, $\Phi_0$ can be representative of the downtilt angle associated with beam 0, $\Phi_1$ can be representative of the downtilt angle associated with beam 1, $\Phi_2$ can be representative of the downtilt angle associated with beam 2, and $\Phi_3$ can be representative of the downtilt angle associated with beam 3. Large $\Phi_i$, where i is a positive integer, can refer to a beam with a large downtilt angle as measured with respect to a vertical axis (e.g., the energy beam is pointing down).

Conversely, small $\Phi_i$ can refer to a beam with a small downtilt angle, which can translate to an energy beam that is pointing up.

Wireless mobile network operator entities (MNOs) can use terrestrial based cellular network equipment, such as long-term evolution (LTE) and/or fifth-generation (5G) core mobile network operator (MNO) equipment (e.g., serving cell equipment, base station equipment, access point equipment, internet of things (IoT) equipment, picocell equipment, femtocell equipment, and/or other similar and pertinent equipment) to provide services to aerial UE. Aerial UE can have multiple use cases (e.g., delivery, monitoring, . . . ). Wireless MNOs can have aerial coverage maps, which can indicate areas with and/or without cellular coverage. In addition, UAVs, such as aerial UE, can scan neighbor equipment signal pilots (e.g., reference signal received power (RSRP) measurement values) to determine whether it can fly in a given direction. In instances where signal pilots are not detectable in a direction in which an UAV is traversing, the UAV can change or adjust its trajectory to better align with cellular coverage where appropriate signal pilots are more evident.

The subject disclosure provides for detecting and/or identifying UE based, for example, on international mobile subscriber identifier (IMSI) values, or subscriber identity module or subscriber identification module (SIM) values (e.g., one or more integrated circuits that can securely store subscriber identification values and related key values and that can be used to identify and authenticate subscriber UE).

In various embodiments, approaching UE can be identified based on other subscriber or subscription data, such as unique UE serial number values, governmentally issued unique identification values (e.g., federal aviation administration tag values), UE manufacturer serial number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated using one-dimensional and/or multi-dimensional scanning technologies and barcode symbology, such as universal product codes (UPCs), matrix bar codes (e.g., quick response (QR) codes) comprising machine-readable optical labels, and the like that can include information about the equipment to which it is attached.

In one or more embodiments, having identified and/or detected an approaching UE, the detected UE can be monitored and tracked to determine whether or not the approaching UE is on a trajectory that may cause the approaching UE to enter into the control and service scope of core network equipment, such as central node global control equipment. In order to determine whether or not the approaching UE may be on a trajectory that may bring it within control and service ambit of core network equipment, artificial intelligence technologies, neural networking architectures, collaborative filtering processes, machine learning techniques, and/or big data mining functionalities can be utilized, wherein, for example, probabilistic determinations based at least in part on cost benefit analyses (e.g., the cost of taking a particular action is weighed against the benefit of taking the particular action, wherein in response to determining that the benefit associated with the action more likely than not outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions are, on a balance of the probabilities, not detrimentally affected.

In example embodiments, in order to track UE entering and/or exiting the control and/or the monitoring ambit (e.g., processes in execution), one or more global navigation satellite system (GNSS) equipment can be used that can provide geolocation and/or time information to global positioning satellite (GPS) equipment (e.g., transmitter and/or receiver equipment) anywhere on or near the earth where there is an unobstructed line of sight to the one or more GNSS equipment, such as one or more GPS satellites in various earth orbits.

Additionally and/or alternatively, other triangulation processes can be used to keep track of UE. For instance, in various embodiments, ranges (e.g., variable distances) can be determined by targeting UE with light amplification by stimulated emission of radiation (e.g., laser) and measuring the time for the reflected light to return to one or more receiver (e.g., lidar) can be used to track UE approaching and/or entering into a determined vicinity of a transmission area cast by serving cell equipment. In a similar manner, a detection system that uses radio waves to determine the range, angle, or velocity of objects (e.g., radar) can be used to determine whether or not UE are approaching and/or entering into the determined vicinity of the monitoring scope of serving cell equipment.

Other mechanisms to track UE can also include using multilateration (e.g., determining UE position based on the measurement of the times of arrival (TOA) of one or more energy wave (e.g., radio, acoustic, seismic, etc.) having known waveforms and/or speed when propagating either from and/or to multiple emitters and/or receivers of the waves) between one or more network equipment (e.g., serving cell equipment, base station equipment, internet of things (IoT) equipment, picocell equipment, femtocell equipment, and similarly functional equipment). In some instances, a UE's returned signal strength values to various antennae associated with the one or mode network equipment can be used to triangulate and provide a positional references as to the trajectory of an individual UE.

In additional and/or alternative instances, timing advance (TA) processes can be used as a measure of TOA. Typically, TA is a determined distance from serving cell equipment based at least in part on delay measurements associated with TOA values. TA values can be reported while aerial UE are in communication with serving cell equipment.

The described embodiments disclose systems and methods for UAVs to detect aerial coverage provided by advanced network serving cell equipment and to react proactively. In effectuating the foregoing. UAV on approaching serving cell equipment can initiate processes to facilitate and/or effectuate the following tasks: (1) receive, from serving cell equipment, RRC_Connection_Reconfiguration" message data and/or SIB1 message data. The RRC_Connection_Reconfiguration" message data and/or SIB1 message data can comprise additional data included in the "ServingCellConfigCommon" object. The additional data can comprise data related to how many SSBs are configured and active (e.g., shortBitmap, mediumBitmap, or longBitmap) and data included in an object associated with "downtiltAngle" which provides down tilt angle data associated with each beam emitted from serving cell equipment; (2) read the SBB data from the "ServingCellConfigCommon" object indicating how many SSBs are configured and active; (3) read the object associated with "downtiltAngle" data to determine the down tilt angles associated with each of the emitted beams; (4) based at least in part on the down tilt angle data associated with each of the beams emitted from the serving cell and the SSB data indicating the number of SSBs that have been configured to be active, initiate a determination as to whether the serving cell equipment associated with the RRC_Connection_Reconfiguration" message data and/or SIB1 message data is capable of providing support for UAVs; (5) based at least in part on the down tilt angle data and/or the SSB data indicating the number of configured active SSBs that serving cell equipment has active, determine a maximum altitude value that UAVs can attain while connected to each energy beam associated with serving cell equipment; (6) feedback data representative of actual altitudes that can have been attained by UAVs while UAVs are connected to each of the energy beams emitted by serving cell equipment, this feedback data can augment previously accrued data pertaining to serving cell equipment and each of the energy beams that the serving cell equipment can have been configured to emit; and (7) based on the actual altitudes attained by UAVs attached to each of the beams emitted by serving cell equipment, updated altitude values with regard to maximum altitude values that UAVs can attain while connected to each energy beam associated with serving cell equipment can be disseminated for future use by UAVs.

In some embodiments, UE information data and/or UE device type data can be collected. UE information data and/or UE device type data can be detected when, where, and whether an aerial UE is attached to, and/or is in operative communication with, the core network (or identifiable segments of the core network). Additionally, in accordance with further example embodiments, data can be collected that is representative of serving cell equipment capabilities, as well as network topologies of serving cell equipment (e.g., the network topologies of serving cell equipment currently providing service to aerial UE and/or terrestrial based UE situated within the broadcast range of current cell equipment and neighboring serving cell equipment that can be immediately proximate to, or positioned at distance from, current serving cell equipment). In accordance with various other example embodiments, data can also be collected that is representative of the geographical topographies and/or locations within which current serving cell equipment and its neighboring serving cell equipment are situated.

In accordance with some embodiments, based at least in part on data representative of UE information and UE device type, it can be determined whether or not a UE is an aerial UE. Information in regard to whether or not UE is an aerial type UE or terrestrial based UE can be conveyed and communicated to central node global control equipment as a flag comprising one or more bits. The central node global control equipment can then utilize and/or consult, for example, one or more database equipment comprising groups of relevant database tuples to correlate the received bits with an UE type (e.g., aerial UE or terrestrial based UE).

Now with reference to FIG. 1 that illustrates a system 100 (e.g., aerial UE, UAV, . . . ) that effectuates advanced networking equipment to provide aerial coverage data to UE such as UAVs and/or aerial UE, in accordance with various embodiments. As illustrated system 100 can comprise acquisition engine 102 that can be communicatively coupled to processor 104, memory 106, and storage 108. Acquisition engine 102 can be in communication with processor 104 for facilitating operation of computer and/or machine executable instructions and/or components by acquisition engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by acquisition engine 102 to produce one or more useful, concrete, and tangible result, and/or transform one or more articles to different states or things. Further, system 100 can also generate and output the useful, concrete, and tangible results, and/or the transformed one or more articles produced by acquisition engine 102, as output 112.

In some embodiments, system 100 can be an aerial Internet of Things (IoT) small form factor equipment capable of effective and/or operative communication with a network topology. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

In various embodiments, UE, such as aerial UE and/or UAVs, can be identified by core network equipment and/or serving cell equipment based at least in part, for example, on IMSI values, or SIM values. Additionally and/or alternatively, approaching UE can be identified by core network equipment and/or serving cell equipment based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated by core network equipment and/or serving cell equipment through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of approaching UE can be effectuated by using computer-vision based recognition technologies, wherein one or more unique surface contours (or identifiable surface point patterns) of the approaching UE can be compared with repositories and databases of manufacturer defined contours or determinable surface point patterns associated with UE.

Once identified and/or detected approaching UE can be monitored and track by core network equipment and/or serving cell equipment to determine whether or not the approaching UE is on a trajectory that may bring it within the control scope of serving cell equipment. In order to determine whether or not the approaching UE may be on a trajectory that may bring it within the control scope of serving cell equipment, core network equipment and/or serving cell equipment, in some embodiments can utilize, for instance, artificial intelligence technologies, neural networking architectures, collaborative filtering processes, machine learning techniques, and/or big data mining functionalities, wherein, for example, probabilistic determinations based at least in part on cost benefit analyses can be performed.

In additional and/or alternative other embodiments, core network equipment and/or serving cell equipment can employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Core network equipment and/or serving cell equipment, in order to track UE entering and/or exiting the control and/or the monitoring ambit of equipment associated with core network equipment and/or serving cell equipment, can also use one or more global navigation satellite system (GNSS) equipment (e.g., global positioning system (GPS) that can provide geolocation and/or time information to GNSS equipment anywhere on or near the earth where there is an unobstructed line of sight to the one or more GNSS equipment, such as one or more GNSS satellites in various earth orbits.

Additionally and/or alternatively, core network equipment and/or serving cell equipment, in some embodiments, can use other triangulation processes to keep track of UE. For instance, in various embodiments, methods for determining ranges (e.g., variable distances) by targeting UE with light amplification by stimulated emission of radiation and measuring the time for the reflected light to return to one or more receiver can be used to track UE approaching and/or entering into a control ambit of one or more serving cell equipment. In a similar manner, core network equipment and/or serving cell equipment can use the facilities and/or functionalities of detection systems that use radio waves to determine the range, angle, or velocity of objects and to determine whether or not UE are approaching and/or entering into the determined vicinity of serving cell equipment.

Other mechanisms used by core network equipment and/or serving cell equipment to track UE can also include determining UE position based on the measurement of the time of arrival (TOA) of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UE's returned signal strength values to various antennae associated with the one or mode network equipment (e.g., network equipment, serving cell equipment, base station equipment, IoT equipment, picocell equipment, femtocell equipment, and similarly functional equipment, . . . ) can be used to triangulate and provide positional references as to the trajectory of an individual UE.

Acquisition engine 102, in some embodiments can effectuate and facilitate receiving, from core network equipment and/or serving cell equipment, RRC_Connection_Reconfiguration" message data and/or SIB1 message data. The RRC_Connection_Reconfiguration" message data and/or SIB1 message data can comprise additional data included in the "ServingCellConfigCommon" object. The additional data can, for example, comprise data related to how many SSBs have been configured and are active (e.g., shortBitmap, mediumBitmap, or longBitmap), as well as data included in an object associated with "downtiltAngle" which can provide down tilt angle data associated with each beam emitted from serving cell equipment.

Additionally, acquisition engine 102 can facilitate: reading of the SBB data from the "ServingCellConfigCommon" object indicating how many SSBs are configured and active, and further reading of the object associated with "downtiltAngle" data to determine the down tilt angles associated with each of the emitted beams.

Further, acquisition engine 102, based at least in part on the down tilt angle data associated with each of the beams emitted from the serving cell and the SSB data indicating the number of SSBs that have been configured to be active, can initiate processes to determine whether the serving cell equipment associated with the RRC_Connection_Reconfiguration" message data and/or SIB1 message data is capable of providing support for UAVs.

Acquisition engine 102, based at least in part on the down tilt angle data and/or the SSB data indicating the number of configured active SSBs that serving cell equipment has active, can determine a maximum altitude value that UAVs can attain while connected to each energy beam associated with serving cell equipment. Additionally, acquisition engine 102 can provide, to core network equipment and/or serving cell equipment, feedback data representative of actual altitudes that can have been attained by UAVs while UAVs are attached to each of the energy beams emitted by serving cell equipment. This feedback data can augment previously accrued data pertaining to serving cell equipment and each of the energy beams that the serving cell equipment can have been configured to emit.

Based on the actual altitudes attained by UAVs attached to each of the beams emitted by serving cell equipment, the updated altitude values with regard to maximum altitude values that UAVs can have been attained while connected to each energy beam associated with serving cell equipment can be disseminated for future use by UAVs when future UAVs are attached to the serving cell equipment.

Figure 2:
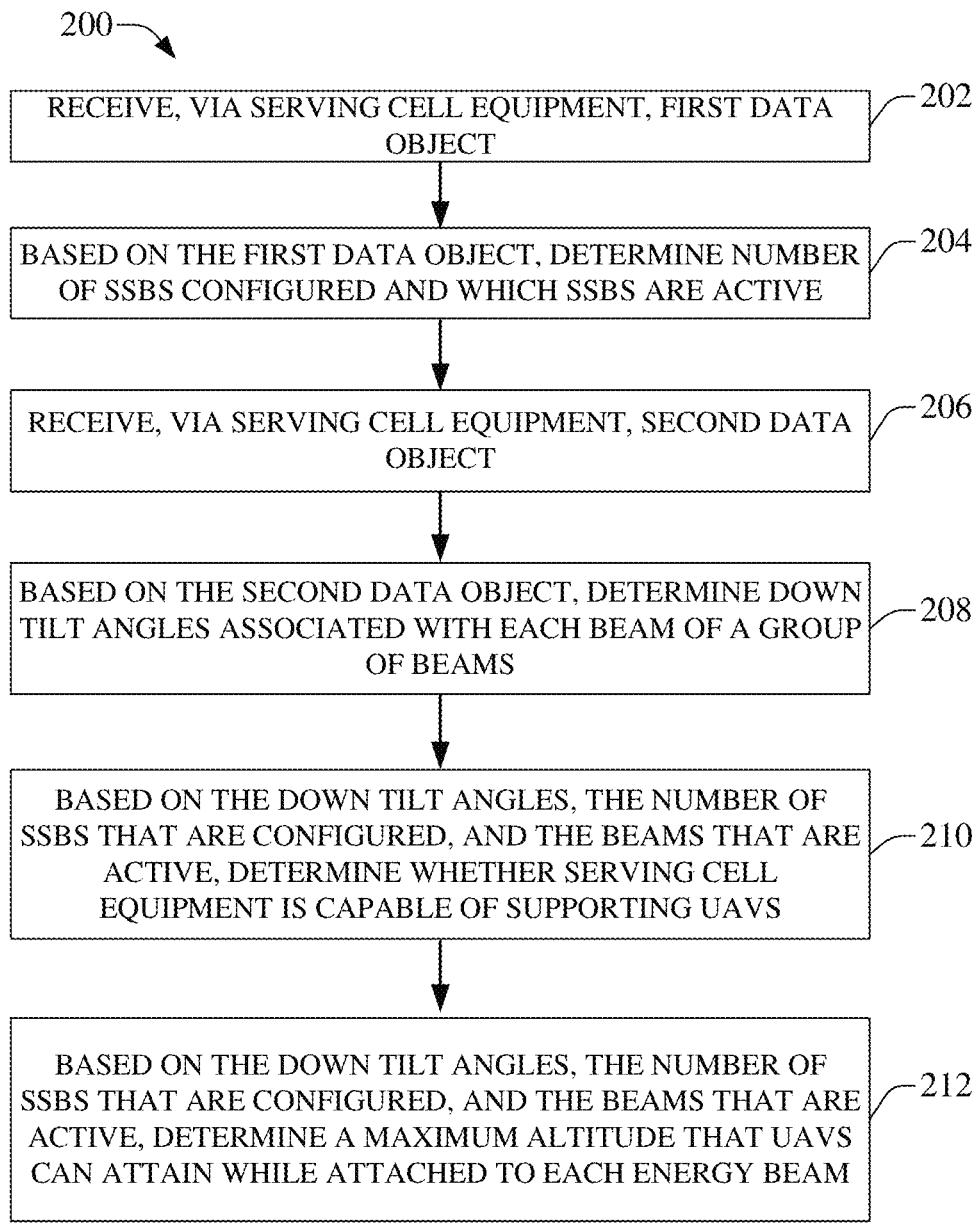
FIG. 2 provides illustration of a flow chart, time sequence chart, or method that can be used to effectuate advanced networking equipment to provide aerial coverage data to UE such as UAVs and/or aerial UE, in accordance with aspects of the subject disclosure.
Figure 3:
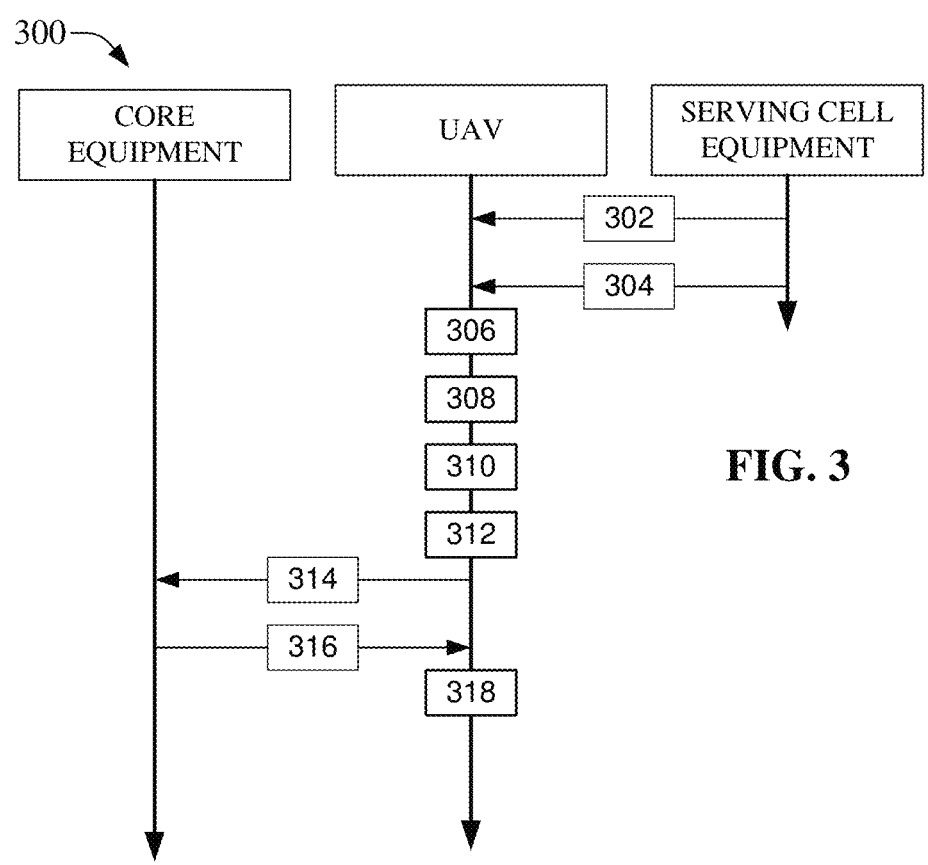
FIG. 3 provides illustration of a flow chart, time sequence chart, or method that can be used to effectuate advanced networking equipment to provide aerial coverage data to UE such as UAVs and/or aerial UE, in accordance with aspects of the subject disclosure.
Figure 4:
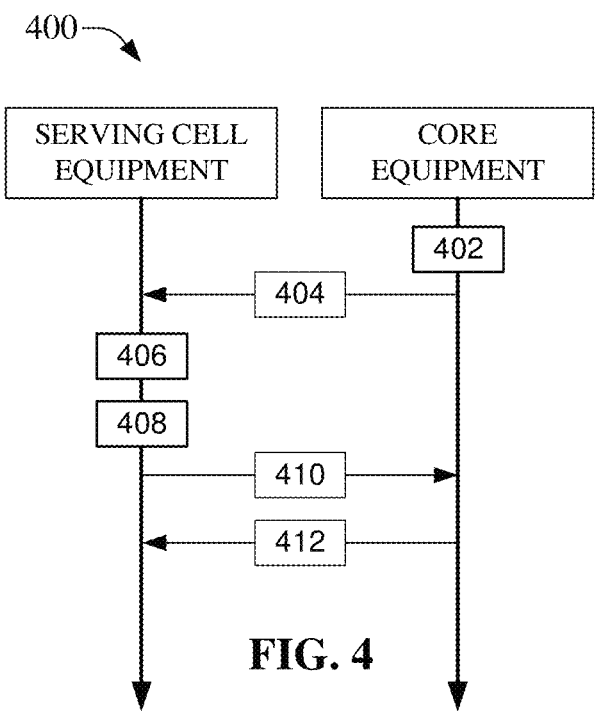
FIG. 4 provides illustration of a flow chart, time sequence chart, or method that can be used to effectuate advanced networking equipment to provide aerial coverage data to UE such as UAVs and/or aerial UE, in accordance with aspects of the subject disclosure.

In view of the example system(s) described above, example method(s) that can be implemented in accordance with the disclosed subject matter can be better appreciated with reference to the flowcharts and/or illustrative time sequence charts in FIGS. 2-4. For purposes of simplicity of explanation, a example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 2 illustrates a flow chart or method 300 that can be used to effectuate advanced networking equipment to provide aerial coverage data to UE such as UAVs and/or aerial UE. Method 200 can be used by aerial equipment, such as aerial UE and/or UAVs. Method 200 can commence at act 202 wherein aerial UE (e.g., acquisition engine 102) can receive, from serving cell equipment, a first data object, such as RRC_Connection_Reconfiguration" message data and/or SIB1 message data. The RRC_Connection_Reconfiguration" message data and/or SIB1 message data can comprise additional data comprising data related to how many SSBs are configured and active (e.g., shortBitmap, mediumBitmap, or longBitmap). At act 204, acquisition engine 102, based on the first data object can determine the number of SSBs that serving cell equipment has configured as well as which of the SSBs are active. At act 206 second object data can be received, the second object data can comprise down tilt angle data associated with each beam emitted from serving cell equipment. At act 208 the second object data can be read to determine the down tilt angles associated with each of the emitted beams. At act 210 based on the down tilt angle data associated with each of the beams emitted from the serving cell and the SSB data indicating the number of SSBs that have been configured and are active, a determination can be effectuated to determine whether the serving cell equipment associated with the RRC_Connection_Reconfiguration" message data and/or SIB1 message data is capable of providing support for UAVs. At act 212, based on the down tilt angle data and/or the SSB data indicating the number of configured active SSBs that serving cell equipment has active, a determination can be made as to the maximum altitude value that UAVs can attain while connected to each energy beam associated with serving cell equipment.

With reference to FIG. 3 illustrates a flow chart, time sequence chart, or method 300 that can be used to effectuate advanced networking equipment to provide aerial coverage data to UE such as UAVs and/or aerial UE. Time sequence chart 300 can commence at act 302 where serving cell equipment can broadcast, to UAVs, RRC_Connection_Reconfiguration" message data and/or SIB1 message data. As, noted above, RRC_Connection_Reconfiguration" message data and/or SIB1 message data can comprise additional data included in the "ServingCellConfigCommon" object. The additional data can comprise data related to how many SSBs are configured and active. At act 304 serving cell equipment can also broadcast, to UAV, data included in an object associated with "downtiltAngle" which can comprise down tilt angle data associated with each beam emitted from serving cell equipment. At act 306 based on the SBB data from the "ServingCellConfigCommon" object a determination can be made with regard to the umber of SSBs have been configured and are active for serving cell equipment. At act 308 based on the object associated with "downtiltAngle" data a further determination can be made in regard to the down tilt angles associated with each of the emitted beams cast by serving cell equipment. At act 310 based at least in part on the down tilt angle data associated with each of the beams emitted from the serving cell and the SSB data indicating the number of SSBs that have been configured to be active, a determination is made as to whether the serving cell equipment associated with the received RRC_Connection_Reconfiguration" message data and/or SIB1 message data is capable of providing support for UAVs. At act 312, based at least in part on the down tilt angle data and/or the SSB data indicating the number of configured active SSBs that serving cell equipment has active, another determination can be made with regard to a maximum permissible altitude value that UAVs can attain while connected to each energy beam associated with serving cell equipment. At act 314 feedback data representative of actual altitudes that can have been attained by UAVs while UAVs are connected to each of the energy beams emitted by serving cell equipment can be sent to core equipment. The feedback data can be used to augment previously accrued data pertaining to serving cell equipment and each of the energy beams that the serving cell equipment can have been configured to emit. At acts 316 and/or 318 based on the actual altitudes attained by UAVs attached to each of the beams emitted by serving cell equipment, updated altitude values with regard to maximum altitude values that UAVs can attain while connected to each energy beam associated with serving cell equipment can be disseminated for future use by UAVs.

FIG. 4 illustrates a flow chart, time sequence chart, or method 400 that can be used to effectuate advanced networking equipment to provide aerial coverage data to UE such as UAVs and/or aerial UE, in accordance with various aspect set forth herein. Time sequence 400 can commence at 402 wherein core network equipment can identify the approach of UAVs within the control and/or monitoring scope of serving cell equipment. At act 404, in response to determining that a UAV is approaching serving cell equipment, core equipment can send data to the serving cell equipment to initiate processes to determine how many SSBs the serving cell equipment has configured and which of the configured SSBs are active and also determine the down tilt angles associated with the configured SSBs as well as the active SSBs. At act 406 serving cell equipment can generate first object data (e.g., RRC_Connection_Reconfiguration" message data and/or SIB1 message data) comprising additional data representing how many SSBs are configured and active and second object data representing down tilt angle data associated with each beam emitted from serving cell equipment. At act 408 the first object data and the second object data can be transmitted to detected UAVs. At act 410, based in UAVs attaching to the various SSBs emitted by serving cell equipment, the down tilt angle data, and/or the SSB data indicating the number of configured active SSBs that serving cell equipment has active, a maximum altitude value that UAVs can attain while connected to each energy beam associated with serving cell equipment can be determined and this data can be sent back to core equipment as being representative of actual altitudes that can have been attained by UAVs while UAVs are connected to each of the energy beams emitted by serving cell equipment. At act 412 based on the actual altitudes attained by UAVs attached to each of the beams emitted by serving cell equipment, updated altitude values with regard to maximum altitude values that UAVs can attain while connected to each energy beam associated with serving cell equipment can be returned by core equipment and thereafter disseminated, by serving cell equipment, for future use by UAVs.

In regard to the foregoing disclosure, it should be noted that central node global control equipment can collect key performance indicator (KPI) values returned to, or received by, serving cell equipment (or central node global control equipment) by UE (terrestrial based and/or aerial) located within the coverage ambit of serving cell equipment. Examples of KPI values that can be returned by UE to serving cell equipment can include: values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can have been periodically returned within measurement reports by UE extant within the control and/or coverage ambit associated with network equipment, such as serving cell equipment, neighboring serving cell equipment, or similar network equipment.

Many use cases of unmanned aerial vehicles (UAVs), such as drones, require beyond visual line of sight (LOS) communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

One main aspect that makes using LTE to serve UAVs challenging is the fact that mobile LTE networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment.

Figure 9:
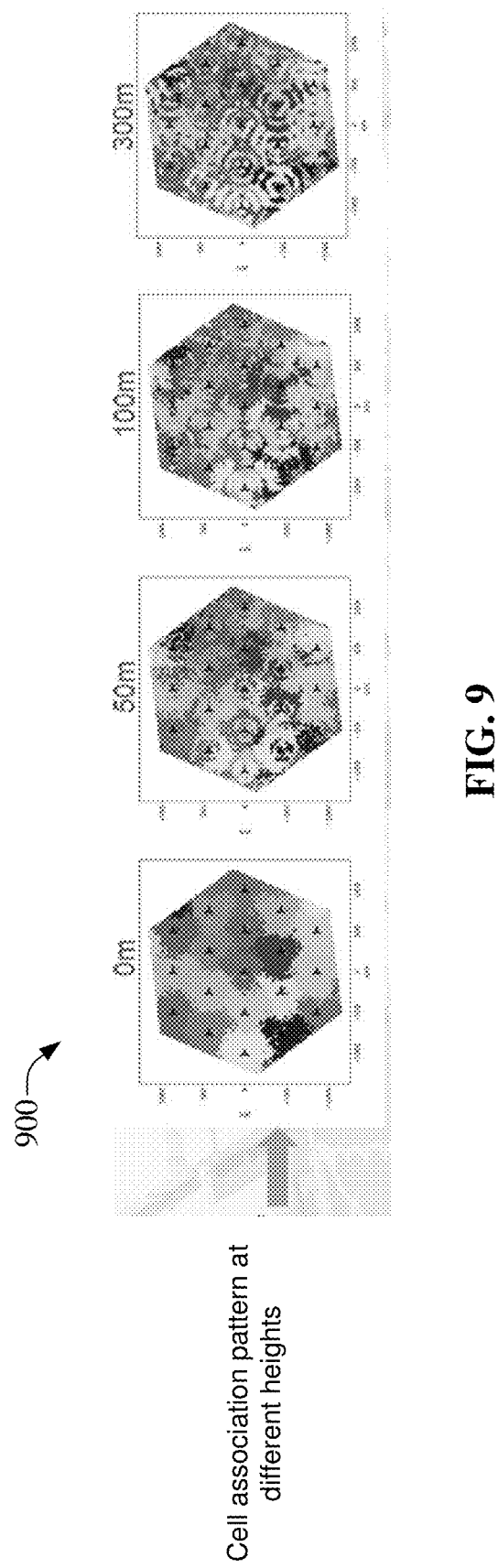
FIG. 9 provides depiction of network equipment association patterns at different altitudes, in accordance with aspects of the subject disclosure.

FIG. 9 provides depiction of the relative disparities in coverage areas between terrestrial coverage areas and aerial coverage areas. In FIG. 9 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

Figure 10:
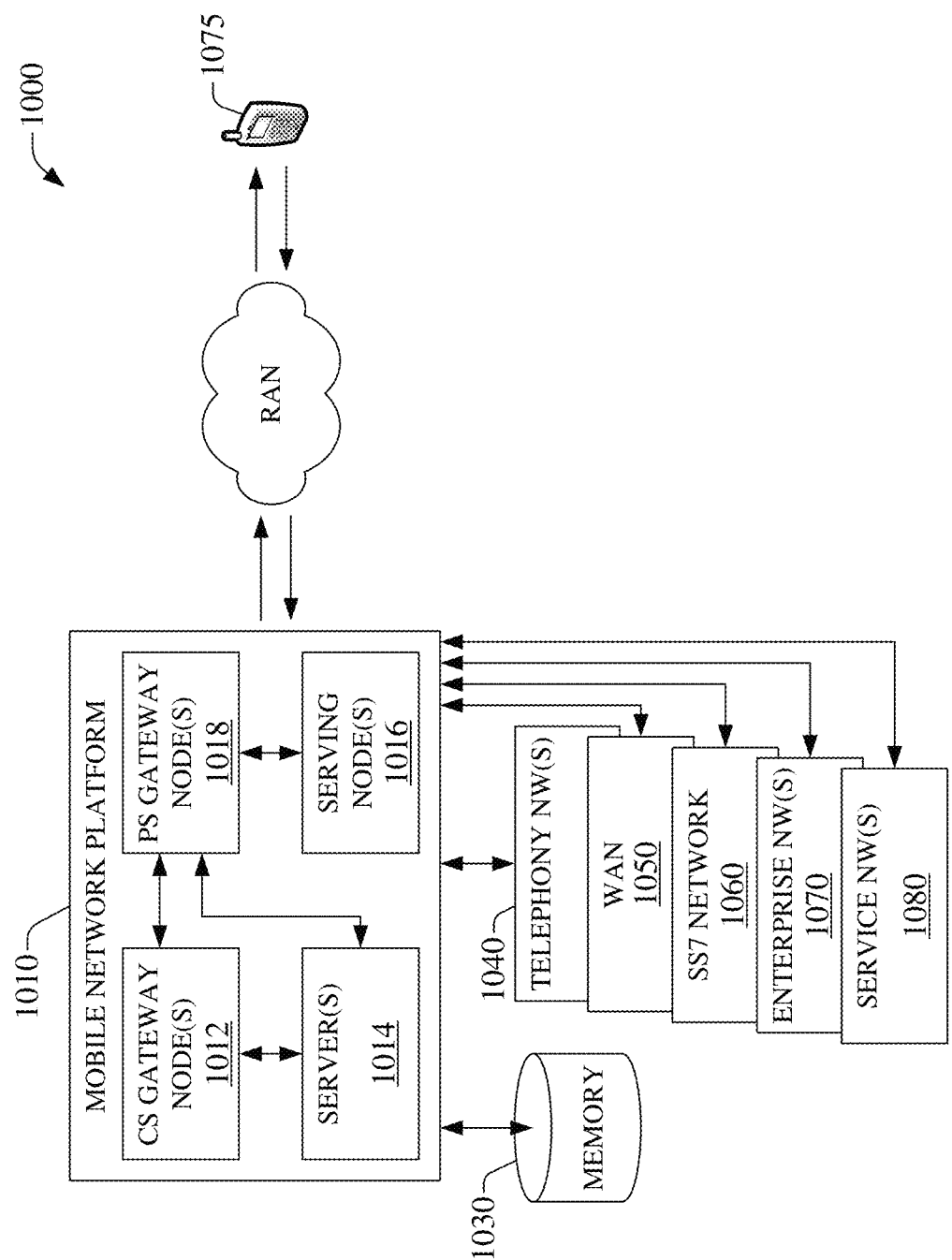
FIG. 10 is a block diagram of an example embodiment of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1060; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1070 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1070, or SS7 network 1060. In an aspect, memory 1030 can be, for example, accessed as part of a data store component or as a remotely connected memory store.

Figure 11:
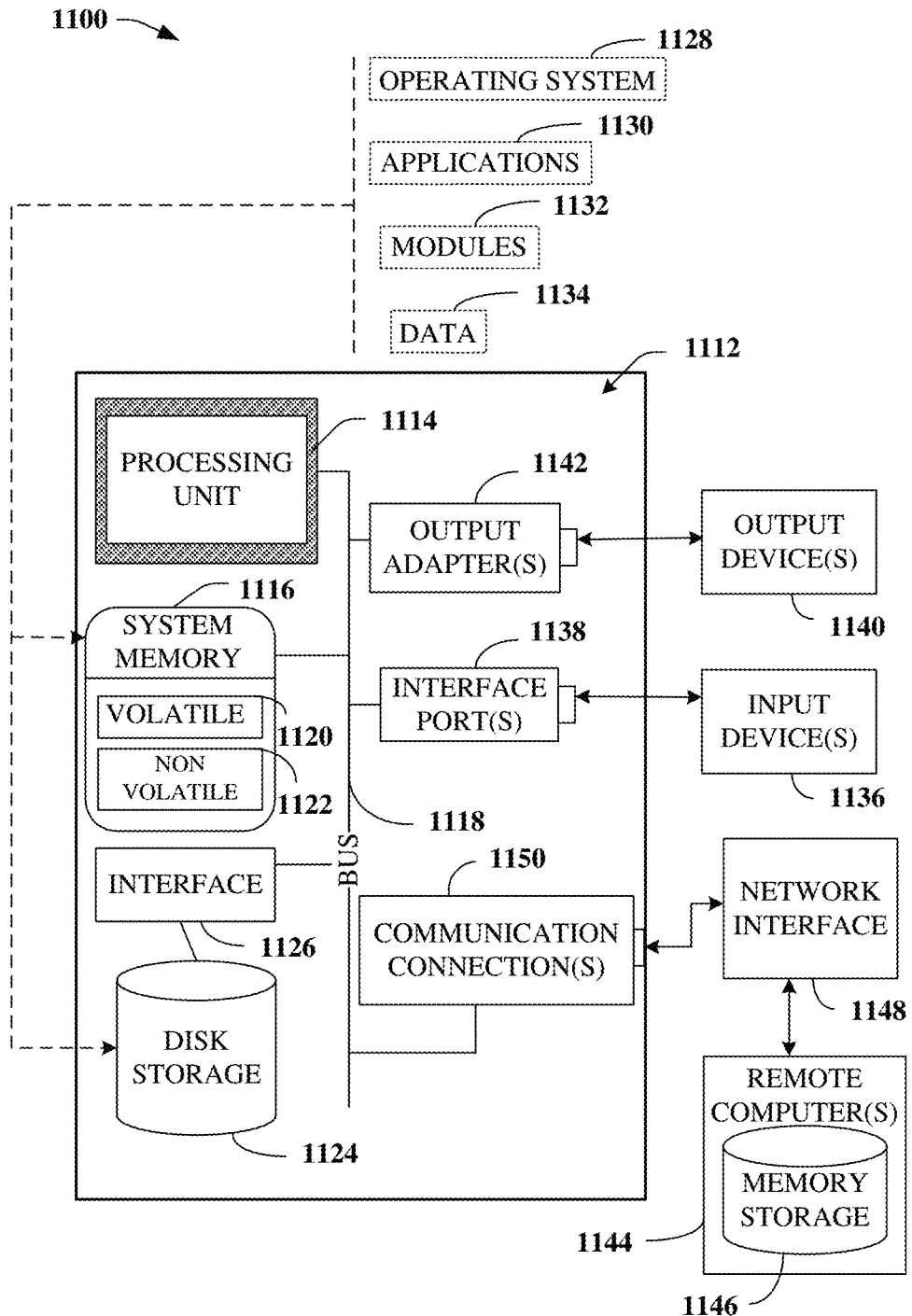
FIG. 11 illustrates a block diagram of a computing system operable to execute the disclosed example embodiments.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute one or more parts of one or more of the disclosed example embodiments. Computer 1112, which can be, for example, part of the hardware of system 100, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
    a processor; and
    a memory that stores instructions that, when executed by the processor, facilitates performance of operations, the operations comprising:
        receiving data object data representative of a data object, for determining a number value associated with a group of energy beams that have been configured to be emitted by serving cell equipment;
        receiving down tilt data representative of a down tilt associated with an energy beam of the group of energy beams; and
        based on the data object data and the down tilt data, determining that the serving cell equipment is capable of servicing an unmanned aerial vehicle.

2. The system of claim 1, wherein the energy beam emitted by the serving cell equipment is used to transmit an over the air waveform to facilitate communication by the serving cell equipment to the unmanned aerial vehicle in a forward link direction.

3. The system of claim 1, wherein the data object data is sent from the serving cell equipment to the unmanned aerial vehicle in a forward link direction.

4. The system of claim 1, wherein the down tilt data is sent from the serving cell equipment to the unmanned aerial vehicle in a forward link direction.

5. The system of claim 1, wherein the data object data comprises string data representative of the energy beam of the group of energy beams that the serving cell equipment is actively emitting.

6. The system of claim 1, wherein the down tilt data comprises string data representative of a down tilt angle associated with a beam of the group of energy beams that the serving cell equipment is actively emitting.

7. The system of claim 1, wherein the down tilt data represents a down tilt angle of a group of antenna array associated with emitting the group of energy beams.

8. The system of claim 7, wherein the down tilt angle is measured from a vertical plane that is orthogonal to a horizontal plane.

9. The system of claim 1, wherein the operations further comprise determining, by the unmanned aerial vehicle, based on the data object associated with the group of energy beams that the serving cell equipment is actively emitting and associated down tilt data, a maximum height over terrain that is achievable to facilitate communication by the serving cell equipment with the unmanned aerial vehicle in a forward link direction.

10. The system of claim 1, wherein the operations further comprise transmitting feedback data from the unmanned aerial vehicle to counterpart network equipment, and wherein the feedback data represents an actual maximum height over terrain achieved based on the group of energy beams emitted by the serving cell equipment and associated down tilt data.

11. A method, comprising:
receiving, by a system comprising a processor, object data for determining a number value associated with a group of beams configured to be emitted by serving cell equipment;
receiving, by the system, down tilt data representative of a down tilt associated with a beam of the group of beams; and
based on the object data and the down tilt data, determining, by the system, that the serving cell equipment is capable of servicing an unmanned aerial vehicle.

12. The method of claim 11, wherein the down tilt data is sent from the serving cell equipment to the unmanned aerial vehicle in a forward link direction.

13. The method of claim 11, wherein the object data comprises binary string data representative of the beam of the group of beams being emitted by the serving cell equipment.

14. The method of claim 11, wherein the down tilt data comprises string data representative of a down tilt angle associated with the beam of the group of beams being emitted by the serving cell equipment.

15. The method of claim 11, wherein the down tilt data represents a down tilt angle of a group of antenna array associated with the group of beams being emitted by the serving cell equipment.

16. The method of claim 15, wherein the down tilt angle is measured from a vertical plane that is orthogonal to a horizontal plane.

17. The method of claim 11, further comprising, based on the beam of the group of beams, determining, by the system, a maximum height over terrain that is achievable to facilitate communication by the serving cell equipment with the unmanned aerial vehicle in a forward link direction.

18. A non-transitory machine-readable medium, comprising executable instructions that, when executed by a processor, facilitate performance of operations, the operations comprising:
receiving object data for determining a number value associated with a group of beams configured to be emitted by serving cell equipment;
receiving down tilt data associated with a beam of the group of beams; and
based on the object data and the down tilt data, determining that the serving cell equipment is capable of servicing an unmanned aerial vehicle.

19. The non-transitory machine-readable medium of claim 18, wherein the operations effectuated by the unmanned aerial vehicle determine that the unmanned aerial vehicle is capable of supporting over the air communications with the serving cell equipment and determine a maximum height over terrain that is achievable between the serving cell equipment and the unmanned aerial vehicle.

20. The non-transitory machine-readable medium of claim 19, wherein the unmanned aerial vehicle, based on determining that the unmanned aerial vehicle is capable of supporting over the air communications with the serving cell equipment and determining the maximum height over terrain that is achievable between the serving cell equipment and the unmanned aerial vehicle, determines to enter a coverage area associated with the serving cell equipment.

* * * * *